March 29, 1960

K. J. KNUDSEN 2,930,233

PYROMETER CIRCUIT

Filed July 3, 1957

INVENTOR.
Knud J. Knudsen
BY
H. Gibner Lehmann
AGENT

March 29, 1960  K. J. KNUDSEN  2,930,233
PYROMETER CIRCUIT
Filed July 3, 1957  2 Sheets-Sheet 2

CHART OF CONNECTIONS EFFECTED BY
DECK 2 OF SELECTOR SWITCH

INVENTOR.
Knud J. Knudsen
BY
H. Gibner Lehmann
AGENT

United States Patent Office 2,930,233
Patented Mar. 29, 1960

2,930,233

PYROMETER CIRCUIT

Knud J. Knudsen, Middlebury, Conn., assignor to Lewis Engineering Company, Naugatuck, Conn., a corporation of Connecticut Application July 3, 1957, Serial No. 669,842

17 Claims. (Cl. 73—360)

This invention relates to high-temperature thermometers or pyrometers employing thermocouples and potentiometer circuits having slide wires.

One object of the invention is to provide a novel and improved potentiometer-type temperature indicator wherein a very wide range of values may be easily and quickly covered by a simplified combination of continuously variable indicator means together with a step-type indicator means.

An additional object is to provide an improved potentiometer circuit having a step-type indicator means, wherein the supply current is automatically held at a constant, preset value for all positions of the indicator, thereby obviating the necessity for constant adjustment and checking of said current as different readings are taken.

Another object of the invention is to provide a novel potentiometer-type pyrometer circuit as above, wherein improved accuracy is had in temperature indications over a wide range of values, as given by a selector-switch or step-type indicator means in conjunction with a continuously variable slide wire control.

Still another object of the invention is to provide an improved pyrometer potentiometer circuit as above characterized, wherein a potentiometer drop resistor and slide-wire shunt resistor are incorporated and connected in a novel control circuit having a switch or step-type indicator means, to the end that there may be effected quick and easy temperature readings while maintaining high accuracy throughout the entire range of operation.

A further object of the invention is to provide, for a potentiometer-type pyrometer having a cold-junction compensating bridge, improved energizing circuits and checking means therefor, wherein the necessary checking of the thermocouple and cold junction may be easily and quickly effected, to minimize errors in the readings.

Other features and advantages will hereinafter appear.

In the drawings accompanying this specification, similar characters of reference indicate corresponding parts wherever possible in the several views, in which.

Figure 1:
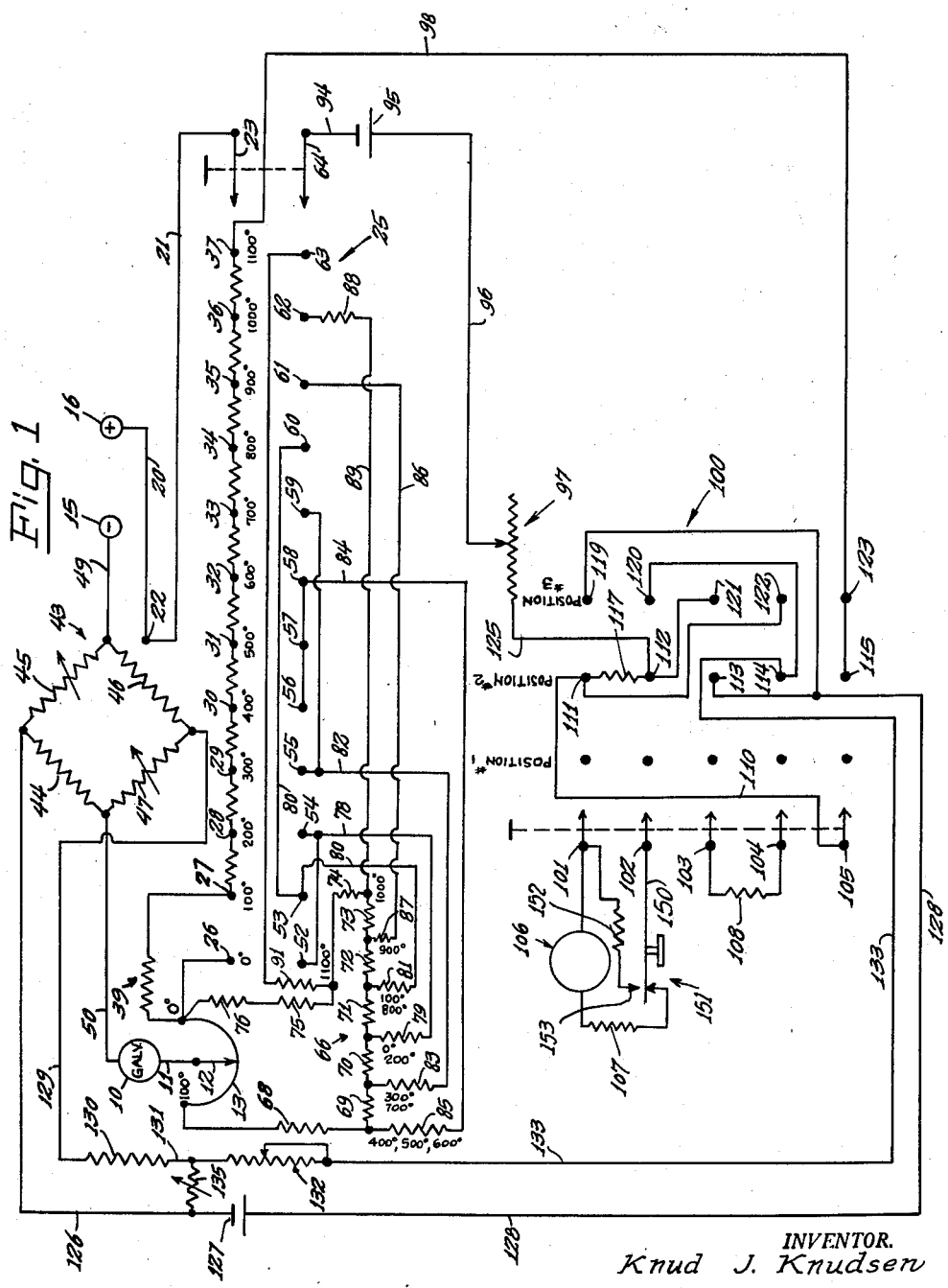
Figure 1 is a schematic circuit diagram of the improved potentiometer-type pyrometer with selector-switch and slide-wire indicators as provided by the invention.

Referring first to Fig. 1, the improved pyrometer shown therein comprises a potentiometer-type circuit which may be adjusted and correlated with temperatures of a thermocouple so as to provide, for example, temperature readings, said circuit having a usual type of oppositely deflectable instrument movement 10, such as a galvanometer or D'Arsonval movement one terminal of which is connected by a wire 11 to a slider 12 of a slide wire 13, the other terminal of the movement 10 being connected in a thermocouple circuit having binding posts 15 and 16 for connection to the thermocouple leads. As shown, the slide wire 13 is preferably of the circular or arcuate type, whereby the slider 12 thereof may be connected to a rotary knob and dial, shown respectively at 18 and 19 in Fig. 2, for the purpose of providing convenient indications of the position of the slider. As viewed in Fig. 1, the left end of the slide wire 13 has been labeled 100°, and the right end has been labeled 0°.

Included in the thermocouple circuit are leads 20 and 21 of Chromel and copper respectively, joined together at a cold junction 22, the copper lead 21 being connected with a contact arm 23 of deck #1 of a multiple-deck selector switch indicated generally by the numeral 25. Deck #1 of the switch 25 comprises a set of contacts numbered respectively 26 through 37, such contacts being engageable selectively one after the other by the contact arm 23. The set of contacts 26–37 is associated with a drop-resistor means indicated generally by the numeral 39, one end of which is connected to that end of the slide wire 13 which is labeled 0°. The drop resistor 39 has a plurality of different points which are connected to the switch contacts 26–37, and such drop resistor may be advantageously constituted of a plurality of individual resistors, 11 in number, connected respectively between different pairs of the contacts 26–37, as shown.

The contacts 26–37 have also been labeled, in Fig. 1, starting with 0° and terminating with 1100°, such designations being in 100° steps.

Figure 2:
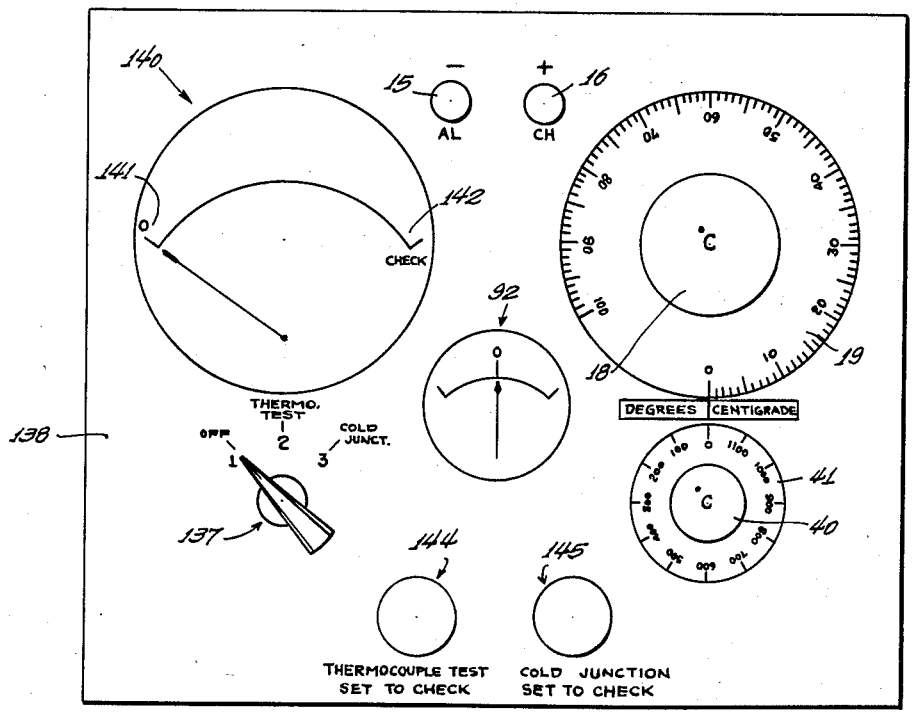
Fig. 2 is a front or face view of the instrument panel of the pyrometer.

The contact arm 23 of the selector switch 25 may have a knob 40 and dial 41, see Fig. 2, by which the positions of the arm are indicated, and such dial may be provided about its periphery with the same temperature designations given above to the contacts 26–37, to wit 0°, 100°, 200°, etc.

The thermocouple circuit of the pyrometer further includes a compensating bridge 43 of a type which is known in the art, for purposes of cold junction compensation. The bridge 43 may have legs 44, 45, 46 and 47 connected in a diamond, the legs 45 and 46 being connected to an Alumel wire 49 joined to the binding post 15 and the legs 44 and 47 being connected to a copper wire 50 joined to the remaining terminal of the instrument movement 10. As shown, the bridge legs 45 and 47 may be of high temperature coefficient wire such as copper or nickel, or a combination of both.

In accordance with the present invention, in conjunction with the slide wire 13 I provide a novel Ayrton-type resistive shunt, and circuit and switching means including different-valued series resistors associated therewith, for cooperation with the contact arm 23 and deck #1 of the selector switch 25 to effect a simplification in the obtaining of temperature readings. Included in this organization is a second contact deck, labeled deck #2 of the switch 25, comprising a set of contacts numbered 52–63 respectively, and a contact arm 64 coupled to and simultaneously movable with the contact arm 23. The contacts 52–63 are paired respectively with the contacts 26–37 so that the pairs are traversed one after another by the contact arms 23 and 64 in response to turning movement imparted to the knob 40 shown in Fig. 2.

The Ayrton-type shunt comprises a resistor indicated generally by the numeral 66, to different points of which the contacts 52–63 are connected in a unique manner and through series resistors the values of which are so chosen as to cause a constant load to be presented at all times to the energizing means for the potentiometer circuit and thus a constant load current when the arms 23 and 64 traverse the switch contacts. This constitutes an important feature of the invention in that, by automatically maintaining constant the energizing current of the potentiometer circuit there is obviated the necessity for continual readjustment when measuring temperatures, as will be more fully set forth below. The shunt resistor 66 may be advantageously constituted of a plurality of individual resistors labeled 68–76 respectively, and the ends of the shunt resistor 66 are shown as being connected respectively to the ends of the slide wire 13.

Figure 3:
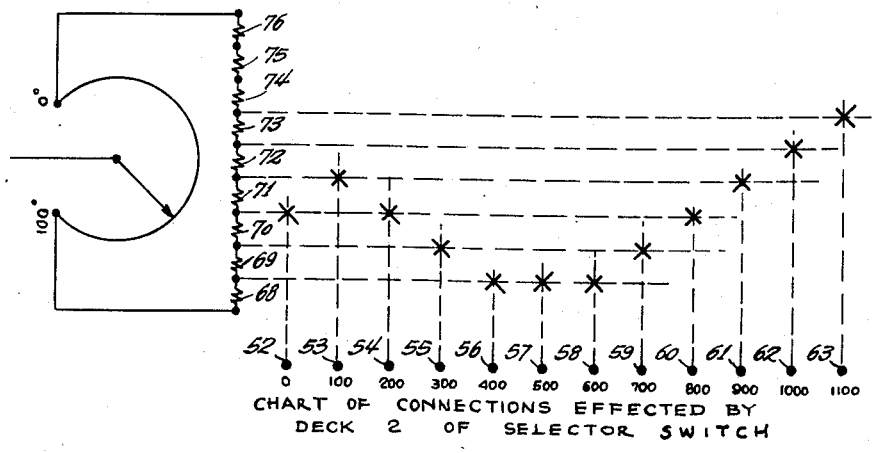
Fig. 3 is a chart of connections effected by an indicating selector switch of the pyrometer circuit.

By the present invention the contacts 52–63 are connected, through the said different values of series resistors, in both forward and reverse orders to points on the shunt resistor 66 constituted by junctions between the individual resistors 68–75. Such order of connections has been illustrated graphically in the chart of Fig. 3 and it may be noted from Fig. 1 that the contacts 52 and 54 are connected together by a wire 78 and through a series resistor 79 to the junction between the resistors 70 and 71. The contacts 53 and 60 are connected together by a wire 80 and through a series resistor 81 to the junction between the resistors 71 and 72. The contacts 55 and 59 are connected together by a wire 82 through a series resistor 83 to the junction between the resistors 69 and 70. The contacts 56, 57 and 58 are connected together by a wire 84 and through a series resistor 85 to the junction between the resistors 68 and 69. The contact 61 is connected by a wire 86 through a series resistor 87 to the junction between the resistors 72 and 73. The contact 62 is connected through a series resistor 88 to a wire 89 joined to the junction between the resistors 73 and 74. And, the contact 63 is connected by a wire 90 through a series resistor 91 to the junction between the resistors 74 and 75.

I have found that, by the above organization and with a suitable energizing means for the potentiometer circuit it is possible, through proper proportioning of the various resistors, to effect extremely accurate adjustment or correlation of the circuit with temperatures of the thermocouple, and accordingly accurate temperature indications using the dial 41 of the selector switch 25, when the slider 12 of the slide wire 13 is at either end of its travel, corresponding to the 0° setting or 100° setting as shown in Figs. 1 and 2, all without continual readjustment of the supply current through the potentiometer circuit. In other words, the total span or range of the slide wire reading, corresponding to the voltage drop across it, is adjusted by the action of the contactor 64, thereby to provide accurate reading points at both ends of the slide wire, of temperatures throughout the range of from zero to 1200°. Moreover, I have found that the remainder of the slide wire dial 19 may be uniformly marked off in graduations of 10° intervals and 1° intervals, as indicated, whereby readings of considerable accuracy between the extreme positions of the dial 19 are obtainable, throughout the entire range of the selector switch 25 and dial 41 thereof. For example, an error less than 1° may be had throughout the entire range of movement of the dial 19 for any setting of the selector switch 25 and dial 41 thereof. It will be understood, of course, that the slide wire 13 and slider 12 thereof are arranged to provide infinitely variable readings between the various steps of temperature indicated by the dial 41.

As is usual with potentiometer circuits, the temperature indication may be read when the dials 19 and 41 are adjusted to effect a null or zeroized indication at the instrument movement 10, such movement having a usual type of dial and pointer, indicated at 92 in Fig. 2.

Through the provision of the series resistors 79, 81, 83, 85, 87, 88 and 91 a proper control of the load current may be effected for each different setting of the selector switch arms 23 and 64 whereby said current may be automatically held constant at a preset, checked value thus making possible the obtaining of highly accurate temperature readings by manipulation of only the switch 25 and slider 12. In other words, regardless of the setting of the switch 25 the loading effected by and the load current supplied to the potentiometer circuit will remain uniform, obviating the necessity of constant readjustment of current as the switch 25 is changed.

Thus, in accordance with my improved potentiometer circuit as above set forth, only two easily readable and settable dials need be manipulated, in conjunction with the indicating instrument 10, 92 in order to obtain readings of the above accuracy, providing that proper initial energization of the potentiometer circuit is provided, and proper energization of the compensating bridge 43.

Given herewith is a table of representative variations or errors which may be expected at the midpoint of the slide wire dial 19 for various settings of the dial 41, when both ends of the slide wire dial read correctly.

| Temperature setting of dials 19 and 41, °C: | Errors, °C. |
|---|---|
| 50 | ¾ |
| 150 | ⅜ |
| 250 | ½ |
| 350 | ¼ |
| 450 | ⅜ |
| 550 | 0 |
| 650 | ¼ |
| 750 | ⅛ |
| 850 | ⅜ |
| 950 | ⅜ |
| 1050 | ⅜ |
| 1150 | ⅜ |

In accordance with this invention I also provide separate battery energizing means respectively for the potentiometer and bridge circuits set forth above, and a novel and improved organization by which such energizing means may be readily checked and adjusted as to their values, thereby to maintain the accuracy of the temperature indications given by the dials 19 and 41. Such checking organization further includes provision for maintaining a uniform loading of the batteries of the energizing means, thereby to minimize battery voltage fluctuations. It is known that batteries upon being disconnected after a period of use will tend to be rejuvenated and have their voltage restored. Also, if during switching or other operations a battery is deprived of its load its voltage will rise and not again immediately resume a steady discharge value. By the present invention I effect voltage stability in the batteries by maintaining the loading thereof uniform.

Also, in the said organization I utilize but a single indicator device for making the said checks, together with a selecting switch mechanism, the latter being so arranged that the battery sources of the potentiometer and bridge energizing means may be open-circuited when the instrument is not in use, thereby to conserve battery life. Accordingly, referring to Fig. 1, the contact arm 64 of the switch 25 is connected by a wire 94 to a battery 95 which is in turn connected by a wire 96 to an adjustable resistor 97, the latter being advantageously in the form of a multiple-turn potentiometer-type of control device.

The potentiometer-circuit energizing means further comprises a wire 98 connected to the switch contact 37, and such wire and the resistor 97 are connected to a multiple pole selector switch indicated generally by the numeral 100, said switch being shown as a five pole three-position switch. The switch 100 has movable contacts or arms 101—105 respectively, the contacts 101 and 102 being connected to a D.C. instrument movement 106 adapted for measuring current, through a series resistor 107. The instrument movement 106 may have a D.C. resistance value of 15 ohms, for example, and the resistor 107 may have a value of 177 ohms, whereby the combined resistance is equal to 192 ohms. The switch contacts 103 and 104 are connected to a resistor 108 which has a resistance of 192 ohms, such resistor being termed a substitute resistor in that it is used alternatively with the indicator means comprising the instrument 106, 107 so as to impose a continuous and uniform load on the batteries of the energizing means, as will be shortly brought out.

The movable contact 105 of the switch 100 is connected by a wire 110 to a stationary contact 111 of the switch, which is engageable with the contact 101 in switch position #2. Aligned with the contact 111 are additional stationary contacts 112—115 respectively, and between the contacts 111 and 112 I connect a resistor 117 of approximately 137 ohms. For switch position #3 there are provided stationary contacts 119—123 respectively, the contacts 121 and 122 being connected respectively to the contacts 112 and 111. Also, the contacts 119 and 120 are connected respectively to the contacts 113 and 114. The switch contacts 115 and 123 are connected together and to the wire 98 of the potentiometer energizing means. A wire 125 connects the contact 112 to the variable resistor 97. The stationary contacts of the switch 100, shown for the "off" position #1, are devoid of any connections.

Referring now to the energizing means for the bridge 43, the junction of the bridge legs 44 and 45 is connected by a wire 126 to a battery 127 which is in turn connected by a wire 128 to the switch contact 113. The junction of the bridge legs 46 and 47 is connected by a wire 129 to a current-limiting resistor 130 which is in turn connected by a wire 131 to a variable control resistor 132. The resistor 132 may be a three-turn potentiometer-type device having a value of 100 ohms, and such control device may be connected by a wire 133 to the contact 114 of the switch 100. Between the wires 126 and 131 I provide an adjustable resistor 135, for calibrating purposes.

Values of various components in the above circuit may be as follows: The battery 127 may have a voltage of 1.5, with a capacity such that it may readily deliver 5 ma. The battery 95 may have a voltage of from 1.3 to 1.5 with a capacity of 12 ma. The variable resistor control 97 may have 60 ohms resistance, and the indicating meter 106 may have a range to 5 ma.

Referring to Fig. 2, the selector switch 100 may have a knob 137, and the three positions thereof, "off" position, "thermocouple test" position and "cold junction" position may be as indicated on the panel 138 of the instrument. The indicator instrument 106 may have a dial 140 provided with a zero current indication 141 and a maximum current or "check" indication 142, the latter corresponding to a current of 5 ma., for example. The adjustable resistor 97 may have a knob 144 for controlling it, and the adjustable resistor 132 may have a knob 145 for the same purpose.

Operation of the energizing means and switch controlled checking means therefor as above set forth, is as follows: When the switch 100 is in the "off" position #1, the batteries 127 and 95 will be open-circuited, and no energy will be drawn therefrom. When the switch 100 is set in position #2, for thermocouple test, the indicator means 106, 107 will be connected across the resistor 117 and the switch contact 105 will engage the contact 115 to complete the battery circuit through the resistor 117 and the potentiometer system. The resistor 97 is now adjusted to obtain a 5 ma. reading at the instrument 106, designated as the "check" indication in Fig. 2. By virtue of the shunt resistor 117, this may correspond actually to a current of 12 ma. drawn from the battery 95. While this is occurring, the resistor 108 is maintaining closed the circuit through the battery 127, and is imposing a load thereon equivalent to that of the indicating means 106, 107. Thus, the battery 127 in being accustomed to such load, will hold its voltage constant. Now, when the switch 100 is thrown to the #3 position, the resistor 108 will be applied across the resistor 117 as a substitute for the indicator means 106, 107, and the latter will be now inserted in the circuit with the battery 127. In consequence of this, the loading of the battery 95 will be maintained by the resistors 108 and 117, and the same loading will be applied to the battery 127 that it had for position #2, now in the form of the indicator means 106, 107. The adjustable control 132 is now varied to obtain maximum deflection of the instrument 106, corresponding to a current of 5 ma. which is being supplied by the battery 127. Preferably a high resistance setting is obtained at the control 132 by suitably adjusting the resistor 135, during the initial calibration of the instrument, whereupon the resistor 135 is thereafter left untouched.

When the above two checks have been made, the switch 100 may be left in either its #2 or #3 position to obtain temperature readings, and it will be understood that the proper energy is being supplied to the compensating bridge 43 and the potentiometer system, duplicating the energy utilized during the initial calibration of the instrument at the factory, and accordingly the overall high accuracy of the instrument may be maintained regardless of variations in the potentials of the batteries 95 and 127.

For the purpose of enabling the zero position of the instrument 106 to be readily checked without removing the normal load from the battery 95, I interpose in the wire 150 connected to the switch contact 102 a push-button switch 151 normally maintaining closed the circuit through the instrument 106. I also provide a resistor 152 connected to the switch contact 101 and also to a contact 153 of the push-button switch 151. When the said push-button switch is actuated, the circuit through the instrument 106 will be opened, whereas the circuit between the switch contacts 101 and 102 will remain closed through the resistor 152, and such latter resistor is made to have a value of 192 ohms, to thereby effect uniformity in the loading of the battery 95 during the zero check of the instrument 106 at such times that the push-button switch 151 is actuated.

It will be understood from the foregoing that I have provided a novel and improved potentiometer-type pyrometer which may be easily and quickly operated to obtain temperature indications having an extremely high degree of accuracy, such pyrometer having cold junction compensation the accuracy of which may be maintained by repeated checking of the energizing means for the compensating bridge. The same checking means may be used for checking the energization of the potentiometer system, and in conjunction with such checking I have provided novel means for maintaining a uniform loading of the separate batteries, thereby to minimize voltage drift thereof.

The pyrometer is seen to be relatively simple, small and compact, and to operate so as to provide accurate temperature indications over a wide range of values, all in a reliable manner and throughout an extended period of use.

Variations and modifications may be made within the scope of the claims, and portions of the improvements may be used without others.

I claim:

1. In a potentiometer-type pyrometer circuit for connection to a thermocouple, an oppositely deflecting instrument movement; a series-connected slide wire and tapped voltage-drop resistor, one end of said resistor being connected to one end of the slide wire; a two-lead thermocouple circuit and a slider for said slide wire, said slider and one lead of said thermocouple circuit being connected respectively to terminals of said instrument movement; a selector switch having a contact arm connected to the other lead of said thermocouple circuit, said switch having a plurality of contacts connected to different taps of said drop resistor; an Ayrton-type shunt resistor connected across said slide wire; an energizing circuit having one lead connected to the other end of said drop resistor; and a second selector switch having a contact arm connected to the other lead of said energizing circuit and having a plurality of contacts connected to points on said shunt resistor to cause a voltage drop across the slide wire, said switches being ganged to effect simultaneous movement of the contact arms thereof whereby the voltage drop across the slide wire is automatically regulated as the ganged switches are actuated to correlate the circuit to a given thermocouple temperature, thereby to maintain accuracy of said correlation when the slider for the slide wire is at either end of the wire.

2. In a potentiometer-type pyrometer circuit for connection to a thermocouple, an oppositely deflecting instrument movement; a series-connected slide wire and tapped voltage-drop resistor, one end of said resistor being connected to one end of the slide wire; a two-lead thermocouple circuit and a slider for said slide wire, said slider and one lead of said thermocouple circuit being connected respectively to terminals of said instrument movement; a selector switch having a contact arm connected to the other lead of said thermocouple circuit, said switch having a plurality of contacts connected to different taps of said drop resistor; an Ayrton-type shunt resistor connected across said slide wire; an energizing circuit having one lead connected to the other end of said drop resistor; and a second selector switch having a contact arm connected to the other lead of said energizing circuit and having a plurality of contacts connected to points on said shunt resistor to cause a voltage drop across the slide wire, said switches being ganged to effect simultaneous movement of the contact arms thereof whereby the voltage drop across the slide wire is automatically regulated as the ganged switches are actuated to correlate the circuit to a given thermocouple temperature, thereby to maintain accuracy of said correlation when the slider for the slide wire is at either end of the wire, the contacts of the first-mentioned selector switch being connected in regular order to progressive points on the drop resistor, and the contacts of the second selector switch being connected some in forward order and some in reverse order to progressive points on the said shunt resistor.

3. In a potentiometer-type pyrometer circuit for connection to a thermocouple, an oppositely deflecting instrument movement; a series-connected slide wire and tapped voltage-drop resistor, one end of said resistor being connected to one end of the slide wire; a two-lead thermocouple circuit and a slider for said slide wire, said slider and one lead of said thermocouple circuit being connected respectively to terminals of said instrument movement; a selector switch having a contact arm connected to the other lead of said thermocouple circuit, said switch having a plurality of contacts connected to different taps of said drop resistor; an Ayrton-type shunt resistor connected across said slide wire; an energizing circuit having one lead connected to the other end of said drop resistor; and a second selector switch having a contact arm connected to the other lead of said energizing circuit and having a plurality of contacts connected to points on said shunt resistor to cause a voltage drop across the slide wire, said switches being ganged to effect simultaneous movement of the contact arms thereof whereby the voltage drop across the slide wire is automatically regulated as the ganged switches are actuated to correlate the circuit to a given thermocouple temperature, thereby to maintain accuracy of said correlation when the slider for the slide wire is at either end of the wire, the contacts of the first-mentioned selector switch being connected in regular order to progressive points on the drop resistor, and the contacts of the second selector switch being connected some in forward order and some in reverse order to progressive points on the said shunt resistor, the contacts of the second selector switch constituting a set traversable one after another by the contact arm from a beginning point to an end point, the initially and finally traversed contacts being connected to points on the shunt resistor in a forward order, and intermediate contacts being connected to points on the shunt resistor in a reverse order.

4. In a potentiometer-type pyrometer circuit for connection to a thermocouple, an oppositely deflecting instrument movement; a series-connected slide wire and tapped voltage-drop resistor, one end of said resistor being connected to one end of the slide wire; a two-lead thermocouple circuit and a slider for said slide wire, said slider and one lead of said thermocouple circuit being connected respectively to terminals of said instrument movement; a selector switch having a contact arm connected to the other lead of said thermocouple circuit, said switch having a plurality of contacts connected to different taps of said drop resistor; an Ayrton-type shunt resistor connected across said slide wire; an energizing circuit having one lead connected to the other end of said drop resistor; and a second selector switch having a contact arm connected to the other lead of said energizing circuit and having a plurality of contacts connected to points on said shunt resistor to cause a voltage drop across the slide wire, said switches being ganged to effect simultaneous movement of the contact arms thereof whereby the voltage drop across the slide wire is automatically regulated as the ganged switches are actuated to correlate the circuit to a given thermocouple temperature, thereby to maintain accuracy of said correlation when the slider for the slide wire is at either end of the wire, the contacts of the first-mentioned selector switch being connected in regular order to progressive points on the drop resistor, and the contacts of the second selector switch being connected some in forward order and some in reverse order to progressive points on the said shunt resistor, the contacts of the second selector switch constituting a set traversable one after another by the contact arm from a beginning point to an end point, the initially and finally traversed contacts being connected to points on the shunt resistor in a forward order, and intermediate contacts being connected to points on the shunt resistor in a reverse order, all of the contacts of said selector switches being paired for simultaneous and selective engagement by the said switch arms, and some of the contacts of the second selector switch being connected directly to other contacts thereof.

5. In a potentiometer-type pyrometer circuit for connection to a thermocouple, an oppositely deflecting instrument movement; a series-connected slide wire and tapped voltage-drop resistor, one end of said resistor being connected to one end of the slide wire; a two-lead thermocouple circuit and a slider for said slide wire, said slider and one lead of said thermocouple circuit being connected respectively to terminals of said instrument movement; a selector switch having a contact arm connected to the other lead of said thermocouple circuit, said switch having a plurality of contacts connected to different taps of said drop resistor; and Ayrton-type shunt resistor connected across said slide wire; an energizing circuit having one lead connected to the other end of said drop resistor; and a second selector switch having a contact arm connected to the other lead of said energizing circuit and having a plurality of contacts connected to points on said shunt resistor to cause a voltage drop across the slide wire, said switches being ganged to effect simultaneous movement of the contact arms thereof whereby the voltage drop across the slide wire is automatically regulated as the ganged switches are actuated to correlate the circuit to a given thermocouple temperature, thereby to maintain accuracy of said correlation when the slider for the slide wire is at either end of the wire, the contacts of the first-mentioned selector switch being connected in regular order to progressive points on the drop resistor, and the contacts of the second selector switch being connected some in forward order and some in reverse order to progressive points on the said shunt resistor, the contacts of the second selector switch constituting a set traversable one after another by the contact arm from a beginning point to an end point, the initially and finally traversed contacts being connected to points on the shunt resistor in a forward order, and intermediate contacts being connected to points on the shunt resistor in a reverse order, the contacts of the second selector switch exceeding nine in number, and the first and third contacts thereof being connected directly to each other.

6. In a potentiometer-type pyrometer circuit for connection to a thermocouple, an oppositely deflecting instrument movement; a series-connected slide wire and tapped voltage-drop resistor, one end of said resistor being connected to one end of the slide wire; a two-lead thermocouple circuit and a slider for said slide wire, said slider and one lead of said thermocouple circuit being connected respectively to terminals of said instrument movement; a selector switch having a contact arm connected to the other lead of said thermocouple circuit, said switch having a plurality of contacts connected to different taps of said drop resistor; an Ayrton-type shunt resistor connected across said slide wire; an energizing circuit having one lead connected to the other end of said drop resistor; and a second selector switch having a contact arm connected to the other lead of said energizing circuit and having a plurality of contacts connected to points on said shunt resistor to cause a voltage drop across the slide wire, said switches being ganged to effect simultaneous movement of the contact arms thereof whereby the voltage drop across the slide wire is automatically regulated as the ganged switches are actuated to correlate the circuit to a given thermocouple temperature, thereby to maintain accuracy of said correlation when the slider for the slide wire is at either end of the wire, the contacts of the first-mentioned selector switch being connected in regular order to progressive points on the drop resistor, and the contacts of the second selector switch being connected some in forward order and some in reverse order to progressive points on the said shunt resistor, the contacts of the second selector switch constituting a set traversable one after another by the contact arm from a beginning point to an end point, the initially and finally traversed contacts being connected to points on the shunt resistor in a forward order, and intermediate contacts being connected to points on the shunt resistor in a reverse order, the contacts of the second selector switch exceeding nine in number, the first and third contacts thereof being connected directly to each other, and the second and ninth contacts thereof being connected directly to each other.

7. In a potentiometer-type pyrometer circuit for connection to a thermocouple, an oppositely deflecting instrument movement; a series-connected slide wire and tapped voltage-drop resistor, one end of said resistor being connected to one end of the slide wire; a two-lead thermocouple circuit and a slider for said slide wire, said slider and one lead of said thermocouple circuit being connected respectively to terminals of said instrument movement; a selector switch having a contact arm connected to the other lead of said thermocouple circuit, said switch having a plurality of contacts connected to different taps of said drop resistor; an Ayrton-type shunt resistor connected across said slide wire; an energizing circuit having one lead connected to the other end of said drop resistor; and a second selector switch having a contact arm connected to the other lead of said energizing circuit and having a plurality of contacts connected to points on said shunt resistor to cause a voltage drop across the slide wire, said switches being ganged to effect simultaneous movement of the contact arms thereof whereby the voltage drop across the slide wire is automatically regulated as the ganged switches are actuated to correlate the circuit to a given thermocouple temperature, thereby to maintain accuracy of said correlation when the slider for the slide wire is at either end of the wire, the contacts of the first-mentioned selector switch being connected in regular order to progressive points on the drop resistor, and the contacts of the second selector switch being connected some in forward order and some in reverse order to progressive points on the said shunt resistor, the contacts of the second selector switch constituting a set traversable one after another by the contact arm from a beginning point to an end point, the initially and finally traversed contacts being connected to points on the shunt resistor in a forward order, and intermediate contacts being connected to points on the shunt resistor in a reverse order, the contents of the second selector switch exceeding nine in number, the first and third contacts being connected directly to each other, the second and ninth contacts being connected directly to each other, and the fourth and eighth contacts being connected directly to each other.

8. In a potentiometer-type pyrometer circuit for connection to a thermocouple, an oppositely deflecting instrument movement; a series-connected slide wire and tapped voltage-drop resistor, one end of said resistor being connected to one end of the slide wire; a two-lead thermocouple circuit and a slider for said slide wire, said slider and one lead of said thermocouple circuit being connected respectively to terminals of said instrument movement; a selector switch having a contact arm connected to the other lead of said thermocouple circuit, said switch having a plurality of contacts connected to different taps of said drop resistor; an Ayrton-type shunt resistor connected across said slide wire; an energizing circuit having one lead connected to the other end of said drop resistor; and a second selector switch having a contact arm connected to the other lead of said energizing circuit and having a plurality of contacts connected to points on said shunt resistor to cause a voltage drop across the slide wire, said switches being ganged to effect simultaneous movement of the contact arms thereof whereby the voltage drop across the slide wire is automatically regulated as the ganged switches are actuated to correlate the circuit to a given thermocouple temperature, thereby to maintain accuracy of said correlation when the slider for the slide wire is at either end of the wire, the contacts of the first-mentioned selector switch being connected in regular order to progressive points on the drop resistor, and the contacts of the second selector switch being connected some in forward order and some in reverse order to progressive points on the said shunt resistor, the contacts of the second selector switch constituting a set traversable one after another by the contact arm from a beginning point to an end point, the initially and finally traversed contacts being connected to points on the shunt resistor in a forward order, and intermediate contacts being connected to points on the shunt resistor in a reverse order, the contacts of the second selector switch exceeding nine in number, the first and third contacts thereof being connected directly to each other, the second and ninth contacts being connected directly to each other, the fourth and eighth contacts being connected directly to each other, and the fifth, sixth and seventh contacts being connected directly to each other.

9. In a potentiometer-type pyrometer circuit for connection to a thermocouple, an oppositely deflecting instrument movement; a series-connected slide wire and tapped voltage-drop resistor, one end of said resistor being connected to one end of the slide wire; a two-lead thermocouple circuit and a slider for said slide wire, said slider and one lead of said thermocouple circuit being connected respectively to terminals of said instrument movement; a selector switch having a contact arm connected to the other lead of said thermocouple circuit, said switch having a plurality of contacts connected to different taps of said drop resistor; an Ayrton-type shunt resistor connected across said slide wire; an energizing circuit having one lead connected to the other end of said drop resistor; and a second selector switch having a contact arm connected to the other lead of said energizing circuit and having a plurality of contacts connected to points on said shunt resistor to cause a voltage drop across the slide wire, said switches being ganged to effect simultaneous movement of the contact arms thereof whereby the voltage drop across the slide wire is automatically regulated as the ganged switches are actuated to correlate the circuit to a given thermocouple temperature, thereby to maintain accuracy of said correlation when the slider for the slide wire is at either end of the wire, and means connected with the said shunt resistor and second switch, for maintaining a constant load on the energizing circuit for different positions of the said ganged contact arms, thereby to effect a constant load current in said circuit.

10. In a potentiometer-type pyrometer circuit for connection to a thermocouple, an oppositely deflecting instrument movement; a series-connected slide wire and tapped voltage-drop resistor, one end of said resistor being connected to one end of the slide wire; a two-lead thermocouple circuit and a slider for said slide wire, said slider and one lead of said thermocouple circuit being connected respectively to terminals of said instrument movement; a selector switch having a contact arm connected to the other lead of said thermocouple circuit, said switch having a plurality of contacts connected to different taps of said drop resistor; an Ayrton-type shunt resistor connected across said slide wire; an energizing circuit having one lead connected to the other end of said drop resistor; and a second selector switch having a contact arm connected to the other lead of said energizing circuit and having a plurality of contacts connected to points on said shunt resistor to cause a voltage drop across the slide wire, said switches being ganged to effect simultaneous movement of the contact arms thereof whereby the voltage drop across the slide wire is automatically regulated as the ganged switches are actuated to correlate the circuit to a given thermocouple temperature, thereby to maintain accuracy of said correlation when the slider for the slide wire is at either end of the wire, and resistors interposed between the said contacts of the second switch and the said shunt resistor, having values such that a constant load is imposed on the energizing circuit for different positions of the said ganged contact arms, thereby to effect a constant load current.

11. In a potentiometer-type pyrometer circuit for connection to a thermocouple, an oppositely deflecting instrument movement; a series-connected slide wire and tapped voltage-drop resistor, one end of said resistor being connected to one end of the slide wire; a two-lead thermocouple circuit and a slider for said slide wire, said slider and one lead of said thermocouple circuit being connected respectively to terminals of said instrument movement; a selector switch having a contact arm connected to the other lead of said thermocouple circuit, said switch having a plurality of contacts connected to different taps of said drop resistor; an Ayrton-type shunt resistor connected across said slide wire; an energizing circuit having one lead connected to the other end of said drop resistor; and a second selector switch having a contact arm connected to the other lead of said energizing circuit and having a plurality of contacts connected to points on said shunt resistor to cause a voltage drop across the slide wire, said switches being ganged to effect simultaneous movement of the contact arms thereof whereby the voltage drop across the slide wire is automatically regulated as the ganged switches are actuated to correlate the circuit to a given thermocouple temperature, thereby to maintain accuracy of said correlation when the slider for the slide wire is at either end of the wire, all of the contacts of the said selector switches being paired for simultaneous and selective engagement by the said switch arms, and some of the contacts of the second selector switch being connected directly to other contacts thereof.

12. In a potentiometer-type pyrometer circuit for connection to a thermocouple, an oppositely deflecting instrument movement; a series-connected slide wire and tapped voltage-drop resistor, one end of said resistor being connected to one end of the slide wire; a two-lead thermocouple circuit and a slider for said slide wire, said slider and one lead of said thermocouple circuit being connected respectively to terminals of said instrument movement; a selector switch having a contact arm connected to the other lead of said thermocouple circuit, said switch having a plurality of contacts connected to different taps of said drop resistor; an Ayrton-type shunt resistor connected across said slide wire; an energizing circuit having one lead connected to the other end of said drop resistor; and a second selector switch having a contact arm connected to the other lead of said energizing circuit and having a plurality of contacts connected to points on said shunt resistor to cause a voltage drop across the slide wire, said switches being ganged to effect simultaneous movement of the contact arms thereof whereby the voltage drop across the slide wire is automatically regulated as the ganged switches are actuated to correlate the circuit to a given thermocouple temperature, thereby to maintain accuracy of said correlation when the slider for the slide wire is at either end of the wire, all of the contacts of said selector switch being paired for simultaneous selective engagement by the said switch arms, some of the contacts of the second selector switch being connected directly to other contacts thereof; and series resistors disposed in the connections to the taps on the said shunt resistor.

13. In a potentiometer-type pyrometer circuit for connection to a thermocouple, an oppositely deflecting instrument movement; a series-connected slide wire and tapped voltage-drop resistor, one end of said resistor being connected to one end of the slide wire; a two-lead thermocouple circuit and a slider for said slide wire, said slider and one lead of said thermocouple circuit being connected respectively to terminals of said instrument movement; a compensating bridge in series in said thermocouple circuit; a pair of separate adjustable energizing circuits connected one to input terminals of said bridge and the other to the unjoined ends of said slide wire and drop resistor, said energizing circuits including batteries; an indicator means and a substitute resistor having a resistance substantially equal to said indicator means; and switching means for simultaneously inserting said indicator means and substitute resistor respectively in series in said energizing circuits, and in alternation therein.

14. In a potentiometer-type pyrometer circuit for connection to a thermocouple, an oppositely deflecting instrument movement; a series-connected slide wire and tapped voltage-drop resistor, one end of said resistor being connected to one end of the slide wire; a two-lead thermocouple circuit and a slider for said slide wire, said slider and one lead of said thermocouple circuit being connected respectively to terminals of said instrument movement; a compensating bridge in series in said thermocouple circuit; a pair of separate adjustable energizing circuits connected one to input terminals of said bridge and the other to the unjoined ends of said slide wire and drop resistor, said energizing circuits including batteries; an indicator means and a substitute resistor having a resistance substantially equal to said indicator means; and switching means for simultaneously inserting said indicator means and substitute resistor respectively in series in said energizing circuits, and in alternation therein, said indicator means including a meter and a resistor connected in series; an additional resistor and a manually operable switching means for optionally substituting said additional resistor for said meter and series resistor to enable a zero check of the meter to be had, said additional resistor having a resistance value equal to the combined resistance values of the meter and series resistor.

15. In a potentiometer-type pyrometer circuit for connection to a thermocouple, an oppositely deflecting instrument movement; a series-connected slide wire and tapped voltage-drop resistor, one end of said resistor being connected to one end of the slide wire; a two-lead thermocouple circuit and a slider for said slide wire, said slider and one lead of said thermocouple circuit being connected respectively to terminals of said instrument movement; a compensating bridge in series in said thermocouple circuit; a pair of separate adjustable energizing circuits connected one to input terminals of said bridge and the other to the unjoined ends of said slide wire and drop resistor, said energizing circuits including batteries; an indicator means and a substitute resistor having a resistance substantially equal to said indicator means; and switching means for simultaneously inserting said indicator means and substitute resistor respectively in series in said energizing circuits, and in alternation therein, and a series resistor permanently connected in the energizing circuit for the said slide wire and drop resistor, said switching means connecting either said indicator means or said substitute resistor across the said series resistor.

16. In a potentiometer-type pyrometer circuit for connection to a thermocouple, an oppositely deflecting instrument movement; a series-connected slide wire and tapped voltage-drop resistor, one end of said resistor being connected to one end of the slide wire; a two-lead thermocouple circuit and a slider for said slide wire, said slider and one lead of said thermocouple circuit being connected respectively to terminals of said instrument movement; a compensating bridge in series in said thermocouple circuit; a pair of separate adjustable energizing circuits connected one to input terminals of said bridge and the other to the unjoined ends of said slide wire and drop resistor, said energizing circuits including batteries; an indicator means and a substitute resistor having a resistance substantially equal to said indicator means; and switching means for simultaneously inserting said indicator means and substitute resistor respectively in series in said energizing circuits, and in alternation therein, and a series resitsor permanently connected in the energizing circuit for the said slide wire and drop resistor, said switching means connecting either said indicator means or said substitute resistor across the said series resistor, said indicator means comprising an instrument movement responsive to current moving through it and having a single indicating mark corresponding to a predetermined value of current for which either of said energizing circuits will be properly set to minimize error in the pyrometer circuit.

17. In a potentiometer-type pyrometer circuit for connection to a thermocouple, an oppositely deflecting instrument movement; a series-connected slide wire and tapped voltage-drop resistor, one end of said resistor being connected to one end of the slide wire; a two-lead thermocouple circuit and a slider for said slide wire, said slider and one lead of said thermocouple circuit being connected respectively to terminals of said instrument movement; a compensating bridge in series in said thermocouple circuit; a pair of separate adjustable energizing circuits connected one to input terminals of said bridge and the other to the unjoined ends of said slide wire and drop resistor, said energizing circuits including batteries; an indicator means and a substitute resistor having a resistance substantially equal to said indicator means; and switching means for simultaneously inserting said indicator means and substitute resistor respectively in series in said energizing circuits, and in alternation therein, said switching means having an "off" position wherein the said batteries are both open-circuited.

References Cited in the file of this patent

UNITED STATES PATENTS

| | | |
|---|---|---|
| 1,199,724 | Wunsch | Sept. 26, 1916 |
| 1,285,563 | Cornman et al. | Nov. 19, 1918 |
| 1,912,242 | Albert | May 30, 1933 |
| 2,003,681 | Doyle | June 4, 1935 |
| 2,083,408 | Stein | June 8, 1937 |
| 2,277,365 | Michael | Mar. 24, 1942 |
| 2,883,617 | Lathrop | Apr. 21, 1959 |